(12) United States Patent
Brignac et al.

(10) Patent No.: US 6,589,418 B2
(45) Date of Patent: Jul. 8, 2003

(54) METHOD FOR SELECTIVE CAT NAPHTHA HYDRODESULFURIZATION

(75) Inventors: Garland B. Brignac, Clinton, LA (US); Joseph J. Kociscin, Piscataway, NJ (US); Craig A. McKnight, Sherwood Park (CA)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 10/043,484

(22) Filed: Jan. 10, 2002

(65) Prior Publication Data

US 2002/0139716 A1 Oct. 3, 2002

Related U.S. Application Data

(60) Continuation-in-part of application No. 09/727,979, filed on Nov. 30, 2000, now abandoned, which is a division of application No. 09/261,453, filed on Mar. 3, 1999, now Pat. No. 6,197,718.

(51) Int. Cl.[7] .................. C10G 45/04; C10G 45/60; C10G 29/00; C10G 29/04
(52) U.S. Cl. .................. 208/216 R; 208/209; 208/213; 208/217; 208/243; 208/244; 208/295
(58) Field of Search ................ 208/216 R, 209, 208/213, 217, 243, 244, 295; 502/216, 219–222, 313, 314, 321

(56) References Cited

U.S. PATENT DOCUMENTS

| | | | | |
|---|---|---|---|---|
| 2,620,362 A | * | 12/1952 | Stiles | 502/216 |
| 3,487,011 A | * | 12/1969 | Henke et al. | 502/222 |
| 4,080,286 A | * | 3/1978 | Yanik et al. | 208/216 R |
| 4,111,796 A | * | 9/1978 | Yanik et al. | 208/216 R |
| 4,176,087 A | * | 11/1979 | Dew et al. | 502/244 |
| 4,213,850 A | * | 7/1980 | Riddick, Jr. et al. | 208/216 R |
| 4,328,127 A | * | 5/1982 | Angevine et al. | 502/221 |
| 4,514,517 A | * | 4/1985 | Ho et al. | 502/220 |
| 4,710,486 A | * | 12/1987 | Lopez et al. | 502/219 |
| 4,824,821 A | * | 4/1989 | Lopez et al. | 502/220 |
| 5,045,518 A | * | 9/1991 | Heinerman et al. | 502/216 |
| 5,162,282 A | * | 11/1992 | Lopez et al. | 502/220 |
| 5,525,211 A | * | 6/1996 | Sudhakar et al. | 208/217 |
| 5,770,046 A | * | 6/1998 | Sudhakar | 208/216 R |

\* cited by examiner

Primary Examiner—Mark L. Bell
Assistant Examiner—Patricia L. Hailey
(74) Attorney, Agent, or Firm—Gerard J. Hughes

(57) ABSTRACT

An improved catalyst activation process for olefinic naphtha hydrodesulfurization. This process maintains the sulfur removal activity of the catalyst while reducing the olefin saturation activity.

11 Claims, 4 Drawing Sheets

▲ STANDARD ACTIVATION ■ IMPROVED ACTIVATION

METHOD FOR SELECTIVE CAT NAPHTHA HYDRODESULFURIZATION

CROSS REFERENCE TO RELATED APPLICATIONS

This application is a continuation-in-part of U.S. patent application Ser. No. 09/727,979, filed Nov. 30, 2000 now abandoned, which is a divisional of U.S. patent application Ser. No. 09/261,453, filed Mar. 3, 1999, now U.S. Pat. No. 6,197,718.

FIELD OF THE INVENTION

The present invention relates to an improved catalyst activation process for olefinic naphtha hydrodesulfurization and using the activated catalyst to desulfurize a catalytically cracked naphtha. The activation process maintains the sulfur removal activity of the catalyst while reducing the olefin saturation activity during hydrodesulfurization.

BACKGROUND OF THE INVENTION

Hydroprocessing petroleum feedstocks to remove heteroatoms, particularly sulfur, is critical to modem refiners in order to meet ever more demanding product quality specifications. Hydroprocessing to remove heteroatoms from hydrocarbon is often referred to as hydrotreating, and hydrodesulfurization refers to a hydrotreating processes for sulfur removal. In hydrodesulfurization, feed sulfur is removed by conversion to hydrogen sulfide, and is typically achieved by reaction with hydrogen over non-noble metal sulfide catalysts, especially those of Co/Mo and Ni/Mo, at fairly severe temperatures and pressures to meet product quality specifications, or to supply a desulfurized stream to a subsequent sulfur sensitive process.

Some naphtha fractions contain olefins, such as, for example, catalytically cracked naphthas or coker naphthas, which typically contain over about 20 wt. % olefins. At least a portion of the olefins are hydrogenated to saturated hydrocarbons during the hydrodesulfurization operation. Since the olefins are high octane components, for some motor fuel use, it is desirable to retain the olefins rather than to convert them to saturated compounds. Conventional fresh hydrodesulfurization catalyst have both hydrogenation and desulfurization activity. Hydrodesulfurization of cracked naphthas using conventional naphtha desulfurization catalysts under conventional startup procedures and under conditions required for sulfur removal, produces a significant loss of olefins through hydrogenation. This can result in a lower grade fuel product which may need further processing to form higher octane fuel, adding significantly to production expenses.

Selective hydrodesulfurization to remove sulfur while minimizing hydrogenation of olefins and octane reduction by various techniques, such as selective catalysts, have been described. For example, U.S. Pat. Nos. 4,132,632 and 4,140,626 disclose selective desulfurizaton of cracked naphthas by using specific catalysts having particular amounts of Group VI and VIII metals on magnesia support. U.S. Pat. No. 4,149,965 discloses a process for starting-up naphtha hydrodesulfurization using partially deactivated hydrotreating catalyst under relatively low pressure of less than 200 psig. The catalyst is partially deactivated using a substantially non-metals containing hydrocarbonaceous oil for a time ranging from about 10 hrs to about 20 days. U.S. Pat. No. 2,983,669 discloses a processes for treating petroleum having a high sulfur content using fractionation and hydrodesulfurization. It is suggested in this '669 patent that the hydrodesulfurization catalyst be one that does not readily promote hydrogenation, such as a partially spent catalyst.

Hydrodesulfurization catalysts age, losing activity during use by collecting deposits of carbonaceous material, impurities, such as metals, from the treated feedstock, or both. Eventually, with increased deposition, the catalyst is no longer able to provide effective hydrodesulfurization. The deactivated catalyst may be regenerated and reused, but is generally less effective than fresh catalyst by requiring higher temperature to give the desired activity and becoming deactivated more quickly than fresh catalyst. Although hydrodesulfurization catalysts can usually be repetitively regenerated, they eventually become irreversibly deactivated, or spent, essentially losing their intended hydrodesulfurization utility.

It is known to hydrodesulfurize an olefinic naphtha by adding a nitrogen compound to the feed in order to deactivate the catalyst for the hydrodesulfurization reaction. See U.S. Pat. No. 2,913,405.

It is also known to hydrotreat a straight run fuel oil at a pressure not greater than 150 psig and at a temperature from 400° to 500° F. in the presence of a catalyst that had been employed in a prior hydrotreating process operated at a higher pressure than the pressure of the fuel oil hydrotreating step until the catalyst had been substantially permanently deactivated for the purpose of said high pressure process, as shown in U.S. Pat. No. 3,870,626.

Spent hydrodesulfurization catalysts have been used in hydrodesulfurization. For example, U.S. Pat. No. 3,876,532 discloses a process for hydrodesulfurizing middle distillate, virgin oils using spent hydrotreating catalysts under extremely mild conditions to reduce acid and mercaptan content, to remove sulfur below 0.2 wt. %, or 2,000 ppm. U.S. Pat. No. 4,414,102 discloses the use of spent hydrodesulfurization catalyst to transform nitrogen- or oxygen-containing compounds to sulfur-containing compounds followed by mild hydrodesulfurization treatment. Also, U.S. Pat. No. 5,286,373 discloses a process for selectively hydrodesulfurizing naphtha by contacting the naphtha, which contains olefins and thiohydrocarbons, with hydrogen under vigorous hydrodesulfurization conditions in the presence of essentially deactivated hydrodesulfurization catalyst which selectively produces hydrogen sulfide and desulfurized hydrocarbons and resulting in a relatively high olefin content.

Although some of the above processes have met with commercial success, there still remains a need in the art for improved activation process for cat naphtha desulfurization catalysts that do not require the use of an additional deactivation step.

SUMMARY OF THE INVENTION

In one embodiment, the invention relates to a hydrodesulfurization process using an activated Co/Mo supported catalyst, comprising:

(a) heating a Co/Mo supported catalyst to a first temperature of about 350° F. to about 450° F. in a first effective amount of time, in the presence of hydrogen and hydrogen sulfide, and in the presence of a substantially olefin-free virgin naphtha at a first effective pressure such that the environment is not a reducing environment;

(b) holding the Co/Mo supported catalyst at 350° F. to about 450° F. for a second effective amount of time so that at least 20% of the metals capable of sulfiding will sulfide;

(c) further heating said Co/Mo supported catalyst to a second temperature from about 550° F. to 700° F. in the presence of hydrogen and hydrogen sulfide and in the presence of the virgin naphtha and at a second effective pressure such that the environment is non-reducing, so that substantially all of the metals are sulfided in order to form the activated CoMo supported catalyst; and (d) selectively hydrodesulfurizing a feedstock containing a cracked naphtha in the presence of a catalytically effective amount of the activated CoMo supported catalyst under selective hydrodesulfurization conditions.

In one embodiment the temperature of step a) is obtained by ramping at a rate of about 10° F. to about 80° F. per hour.

In another embodiment the total pressure is from about 200 to 400 psig.

In yet another embodiment, a selectively hydrodesulfurized product is conducted away from the process for storage or further processing, such as blending, and especially blending to make gasoline and other fuel products.

DETAILED DESCRIPTION OF THE INVENTION

Figure 1:
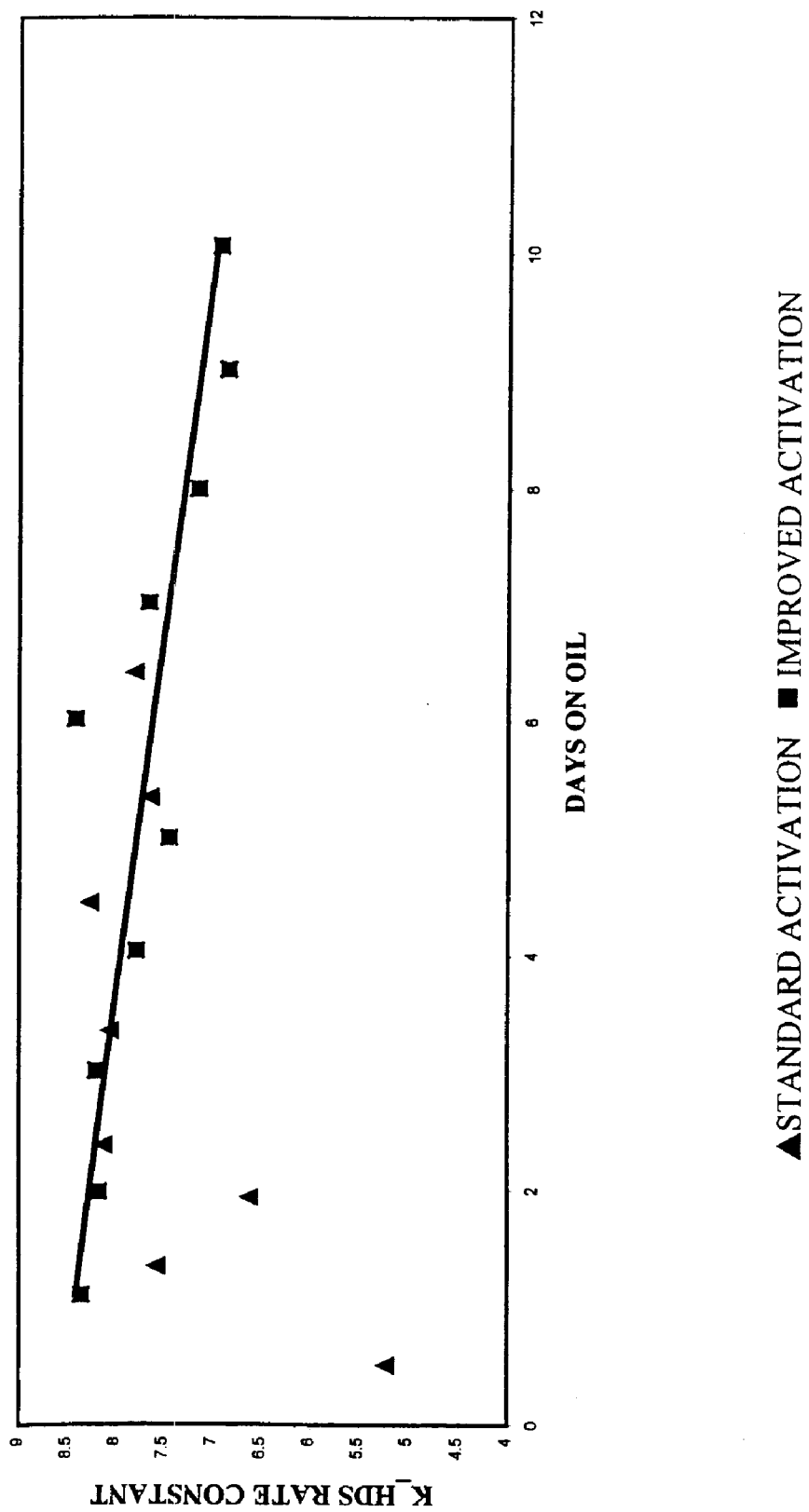
FIG. 1 is a plot of pilot plant data for the desulfurization of a cat naphtha versus days on oil using both a conventional catalyst activation procedure and the catalyst activation procedure.

The invention is based on the discovery of a catalyst and process useful in the selective hydrodesulfurization of a naphtha that contains significant amounts of both sulfur and olefins, while minimizing loss in octane. Naphtha feeds suitable for selective hydrodesulfurization can comprise any one or more refinery streams boiling in the range from about 50° F. to about 450° F., at atmospheric pressure. The naphtha feedstock can contain cracked naphtha which usually comprises fluid catalytic cracking unit naphtha (cat naphtha), coker naphtha, hydrocracker naphtha, resid hydrotreater naphtha, debutanized natural gasoline (DNG), and gasoline blending components from other sources wherein a naphtha boiling range stream can be produced. Cat naphtha and coker naphtha are generally more olefinic naphthas since they are products of catalytic and/or thermal cracking reactions, and are the more preferred feeds.

The naphtha hydrodesulfurization feedstock, preferably a cracked naphtha feed stock, generally contains not only paraffins, naphthenes, and aromatics, but also unsaturates, such as open-chain and cyclic olefins, dienes, and cyclic hydrocarbons with olefinic side chains. The feedstock generally comprises an overall olefins concentration ranging as high as about 60 wt. %, more typically about 5 wt. % to 50 wt. %, and most typically from about 5 wt. % to about 40 wt. %. The cracked naphtha feedstock can comprise a diene concentration of as much as 15 wt. %, preferably from about 0.02 wt. % to about 15 wt. %, and more preferably from about 0.02 to 5 wt. %, based on the weight of the feed stock. High diene concentrations can result in a gasoline product with poor stability and color. The cracked naphtha feedstock sulfur content will generally range from about 0.05 wt. % to about 0.7 wt. % and more typically from about 0.07 wt. % to about 0.5 wt. % based on the total weight of the feed stock. Nitrogen content will generally range from about 5 wppm to about 500 wppm, and more typically from about 20 wppm to about 200 wppm.

In one embodiment, the selective hydrodesulfurization process employs an activated hydrodesulfurization catalyst. In one embodiment, a conventional naphtha hydrodesulfurization catalyst is activated and then employed as a selective hydrodesulfurization catalyst. Generally, such conventional catalysts will be comprised of at least one Group VIII metal, selected from Ni and Co and at least one Group VI metal selected from Mo and W, and an inorganic support material. It is preferred for naphtha desulfurization that the Group VIII metal be Co and the Group VI metal be Mo. The concentration of metal will typically be from about 2 to 60 wt. %, preferably from about 5 to 50 wt. %, and more preferably from about 8 to 40 wt. %. The ratio of Group VIII metal to Group VI metal will typically be from about 0.5:1 to about 100:1, preferably from about 1:1 to about 20:1; and more preferably from about 0.6:1 to about 10:1. The surface area, pore volume, grain size, skeletal or grain density, for, and other characteristics of the catalyst may be any effective, including known type or amount. Illustrative catalysts are presented in the *Oil and Gas Journal*, dated Oct. 14, 1991 on pages 43 to 78, which is incorporated herein by reference.

A particularly preferred catalyst for activation using the methods described herein is one having properties which include: (a) a $MoO_3$ concentration of about 1 to 10 wt. %, preferably about 2 to 8 wt. %, and more preferably about 4 to 6 wt. %, based on the total weight of the catalyst; (b) a CoO concentration of about 0.1 to 5 wt. %, preferably about 0.5 to 4 wt. %, and more preferably about 1 to 3 wt. %, also based on the total weight of the catalyst; (c) a Co/Mo atomic ratio of about 0.1 to about 1.0, preferably from about 0.20 to about 0.80, more preferably from about 0.25 to about 0.72; (d) a median pore diameter of about 60 Å to about 200 Å, preferably from about 75 Å to about 175 Å and more preferably from about 80 Å to about 150 Å; (e) a $MoO_3$ surface concentration of about $0.5 \times 10^{-4}$ to about $3 \times 10^{-4}$ g. $MoO_3/m^2$, preferably about $0.75 \times 10^{-4}$ to about $2.5 \times 10^{-4}$, more preferably from about $1 \times 10^{-4}$ to about $2 \times 10^{-4}$; and (f) an average particle size diameter of less than 2.0 mm, preferably less than about 1.6 mm, more preferably less than about 1.4 mm, and most preferably as small as practical for a commercial hydrodesulfurization process unit. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster et al., *Journal of Catalysis* 63, pp 515–519 (1980), which is incorporated herein by reference. The Oxygen Chemisorption Test involves edge-plane area measurements made wherein pulses of oxygen are added to a carrier gas stream and thus rapidly traverse the catalyst bed. For example, the oxygen chemisorption will be from about 800 to 2,800, preferably from about 1,000 to 2,200, and more preferably from about 1,200 to 2,000 µmol oxygen/gram $MoO_3$. The terms hydrotreating and hydrodesulfurization are sometimes used interchangeably.

Hydrogen is employed in catalyst activation step and in hydrodesulfurization step using the activated catalyst. The hydrogen for either step may be provided as substantially pure hydrogen gas or may contain inert or other gases, including light hydrocarbons. Any hydrogen not consumed during the activation or hydrodesulfurization may be recycled for reuse. The hydrogen is generally provided as hydrogen-containing gas with a major amount of, over half up to nearly pure, hydrogen gas with the balance being inert or hydrocarbonaceous gases. The amount of hydrogen used may be any amount effective for hydrodesulfurization to occur. Typically, hydrogen is added for continuous reactions at a treat gas ratio of from about 500 scf/B to about 5,000 scf/B, preferably from about 1,200 scf/B to about 3,000 scf/B, wherein scf/B means standard cubic feet per barrel.

In the activation step, the catalyst is first heated to a first end temperature of about 350° F. to about 450° F. in an atmosphere containing hydrogen and hydrogen sulfide at a concentration that will provide a non-reducing environment. The heating to this first end temperature is conducted in an effective amount of time. That is by ramping the temperature at a rate such that a non-reducing sulfiding environment is maintained. This heating rate will typically be from about 10° F./hr to about 80° F./hr, preferably from about 30° F./hr to about 60° F. per hour. This heating will be conducted in a hydrogen/hydrogen sulfide environment, in the presence of virgin naphtha, and at an effective pressure. That is, at a pressure that will also maintain a non-reducing sulfiding environment. Typical pressures will be from about 200 to 400 psig total pressure, preferably about 250 to 350 psig total pressure. By virgin naphtha we mean a naphtha that preferably comes directly from a pipe still and thus is not a cracked naphtha from a downstream process unit. Virgin naphthas are typically substantially sulfur and olefin free. The sulfur content of a virgin naphtha will usually be from about 100 to about 1,000 wppm, have a nitrogen content from about 0.1 wppm to 50 wppm, and containing substantially no olefins.

The catalyst will be held at this first end temperature for an effective amount of time. That is, for a time sufficient to sulfide at least about 20% of the metal of said catalyst. This holding period will typically be from about 2 hours to about 24 hours, preferably from about 5 hours to about 15 hours.

The catalyst, after said holding period, will be heated to a second end temperature at an effective heating rate. This second heating will also be in the presence of a hydrogen/hydrogen sulfide environment and also in the presence of a virgin naphtha. The heating rate and the total pressure will be such that a non-reducing sulfiding environment is maintained. The heating rate and the total pressure will be within the ranges given for heating to the first end temperature. The catalyst will be held at this second end temperature also for an effective amount of time. This effective amount of time will be for a time sufficient to allow substantially complete sulfiding of the catalytic metals of said catalyst in order to form the activated catalyst.

The activated catalyst is employed in a selective hydrodesulfurization step. The selective hydrodesulfurization process using the activated catalyst typically begins with a feedstock preheating step. While the feedstock preferably contains cracked naphtha, it may also contain other naphtha boiling range hydrocarbons such as virgin naphtha. In one embodiment, the feedstock is preheated in feed/effluent heat exchangers prior to entering a furnace for final preheating to a targeted reaction zone inlet temperature. The feedstock can be contacted with a hydrogen-containing stream prior to, during, or after preheating, or during some combination thereof. The hydrogen-containing stream can also be added in the hydrodesulfurization reaction zone. As discussed, the hydrogen-containing stream can be pure hydrogen or can be in a mixture with other components found in refinery hydrogen streams. However, it is preferred that the hydrogen-containing stream have little, if any, hydrogen sulfide. The hydrogen-containing stream purity should be at least about 50% by volume hydrogen, preferably at least about 65% by volume hydrogen, and more preferably at least about 75% by volume hydrogen for best results.

Suitable selective hydrodesulfurization conditions will vary as a function of the concentration and types of sulfur of the feedstock. Generally, hydrodesulfurization conditions include: temperatures from about 230° C. to about 427° C., preferably from about 260° C. to about 355° C.; pressures from about 60 to 800 psig, preferably from about 200 to 500 psig; hydrogen feed rates of about 1000 to 5000 standard cubic feet per barrel (scf/b), preferably from about 1000 to 2500 scf/b; hydrogen purity from about 20 to 100 vol. %, preferably from about 65 to 100 vol. %; and liquid hourly space velocities of about 0.5 $hr^{-1}$ to about 15 $hr^{-1}$, preferably from about 0.5 $hr^{-1}$ to about 10 $hr^{-1}$, more preferably from about 1 $hr^{-1}$ to about 5 $hr^{-1}$. Reaction pressures and hydrogen circulation rates below these ranges can result in higher catalyst deactivation rates resulting in less effective selective hydrotreating. Excessively high reaction pressures and hydrogen circulation rates increase energy and equipment costs and provide diminishing marginal benefits.

The reaction zone can be comprised of one or more fixed bed reactors each of which can comprise one or more catalyst beds. It will be understood that other types of catalyst beds can be used, such as fluid beds, ebullating beds, moving beds, etc. Interstage cooling between fixed bed reactors, or between catalyst beds in the same reactor, can be employed since some olefin saturation will take place, and olefin saturation and the desulfirization reaction are generally exothermic. A portion of the heat generated during hydrodesulfurization can be recovered. Where this heat recovery option is not available, cooling may be performed through cooling utilities such as cooling water or air, or through use of a hydrogen quench stream. In this manner, optimum reaction temperatures can be more easily maintained.

This invention will be further understood by the following examples.

EXAMPLE 1

Figure 2:
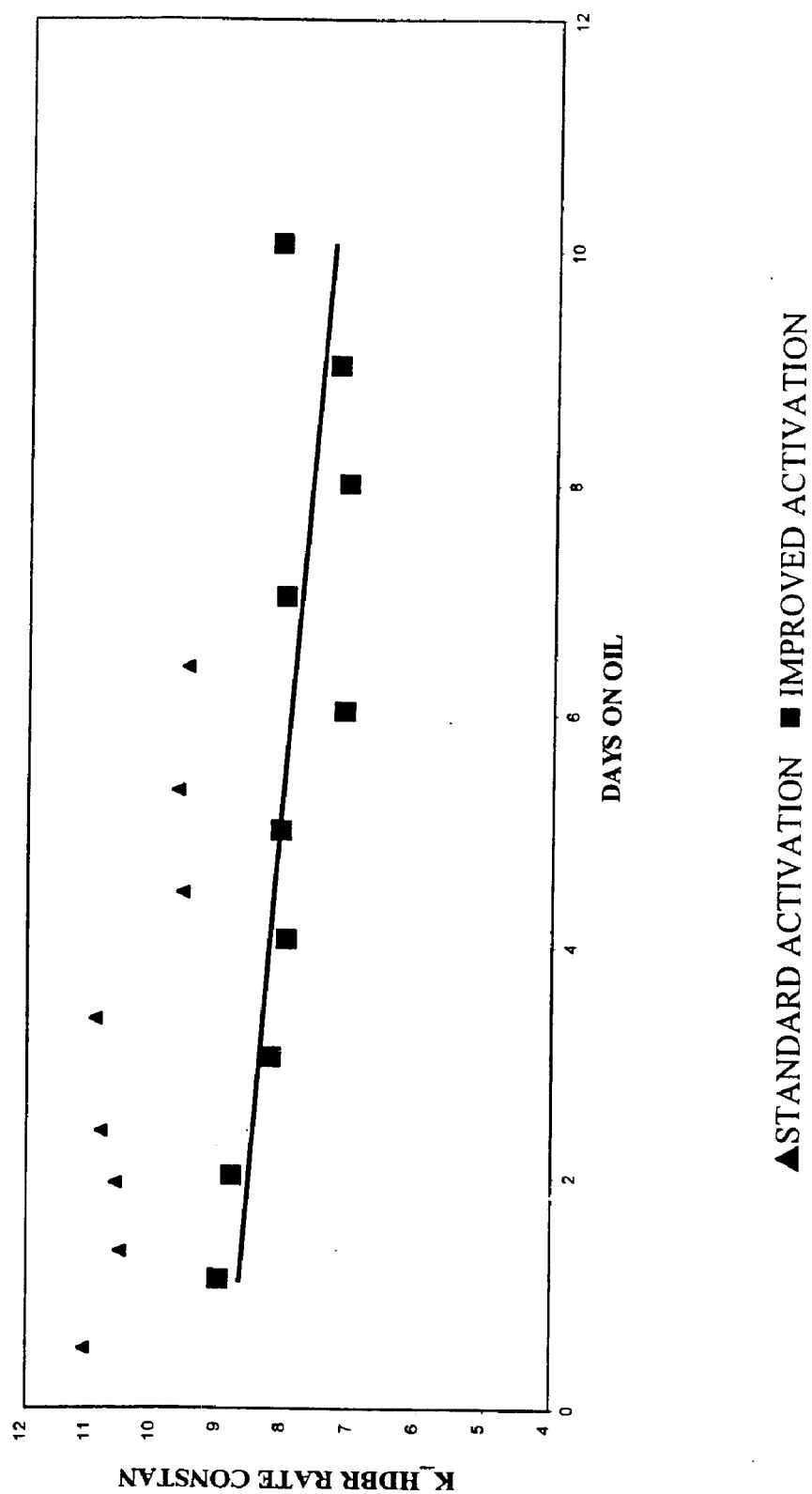
FIG. 2 is a plot of data showing olefin saturation for a cat naphtha using a conventional catalyst activation in a pilot plant and the catalyst activation procedure in a commercial unit.

A commercially prepared, reference batch of catalyst available from Criterion under the name C-447 was used in this test. The catalyst (C-447) was comprised of 15.3 wt. % $MoO_3$, 4.32 wt. % CoO on an alumina support. The catalyst was tested in a commercially available 1.6 mm trilobe size. The improved activation method was performed in-situ with a 10 mole % $H_2S/H_2$ gas blend (384 scf/B gas rate) and a virgin light naphtha which is low in sulfur (about 200 wppm), and nitrogen (about 0.1 wppm) and olefins (substantially none), for approximately 14 hrs at two holding temperatures, 400 (gas/liquid mixed phase and 650° F. (all vapor phase) with reactor pressure of 300 psig. The reactor was then cooled to 250° F. before the introduction of the cat naphtha feed. The test was performed in an isothermal, downflow, all vapor-phase pilot plant. The activity test used an intermediate/heavy cat naphtha feed with a 162–475° F. boiling range, 1850 wppm total sulfur, and 26 bromine number. Catalyst volume loading was 20 cubic centimeters. Reactor conditions were 500° F., 2600 scf/B, 100% hydrogen treat gas and 300 psig total inlet pressure. Space velocity was held constant at 6.5 LHSV. HDS levels ranged between 97.4 and 96.1% and olefin saturation between 46.7 and 40.2%. For comparison, a conventional type of activation of the same batch of C-447 was performed in-situ with a 10 mole % $H_2S/H_2$ gas blend (0.85 scf/hr gas rate) for approximately 14 hrs at two holding temperatures, 450 and 700° F. with reactor pressure of 30 psig. After cooling to 200° F., other parameters were kept the same as the improved activation method. FIG. 1 hereof, shows that the improved activation method preserves catalyst activity for desulfurization of the intermediate/heavy cat naphtha. FIG. 2 hereof shows that the improved activation method reduces olefin saturation activity. Table I hereof summarizes the benefit from the improved activation method.

EXAMPLE 2

A pilot plant containing a stacked catalyst bed was used. The lower most, or downstream most catalyst bed contained the C-447 catalyst (Catalyst B) as described in Example 1 above. The upper most, or upstream catalyst bed contained a catalyst (Catalyst A) comprised of about 1.2 wt. % CoO, 4.5 wt. % $MoO_3$ on an alumina support and having a median pore diameter of about 87 Å. The ratio of each catalyst to each other was about 50/50. This stacked catalyst bed was activated by the same conventional type procedure as recited in Example 1 above.

Figure 3:
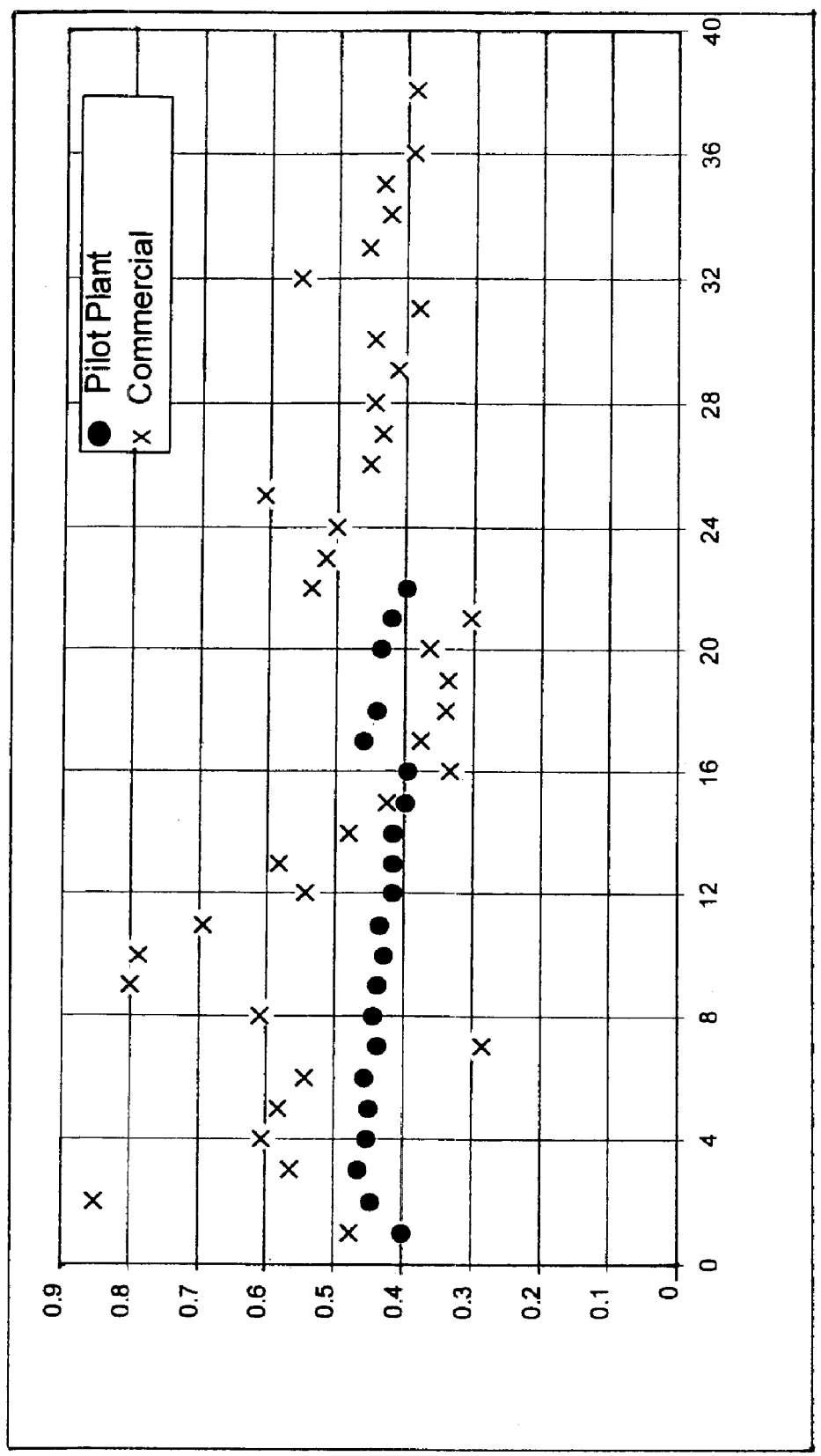
FIG. 3 is a plot of data showing desulfurization of a cat naphtha in a stacked catalyst bed arrangement using a conventional catalyst activation procedure in a pilot plant, versus the catalyst activation procedure in a commercial unit.
Figure 4:
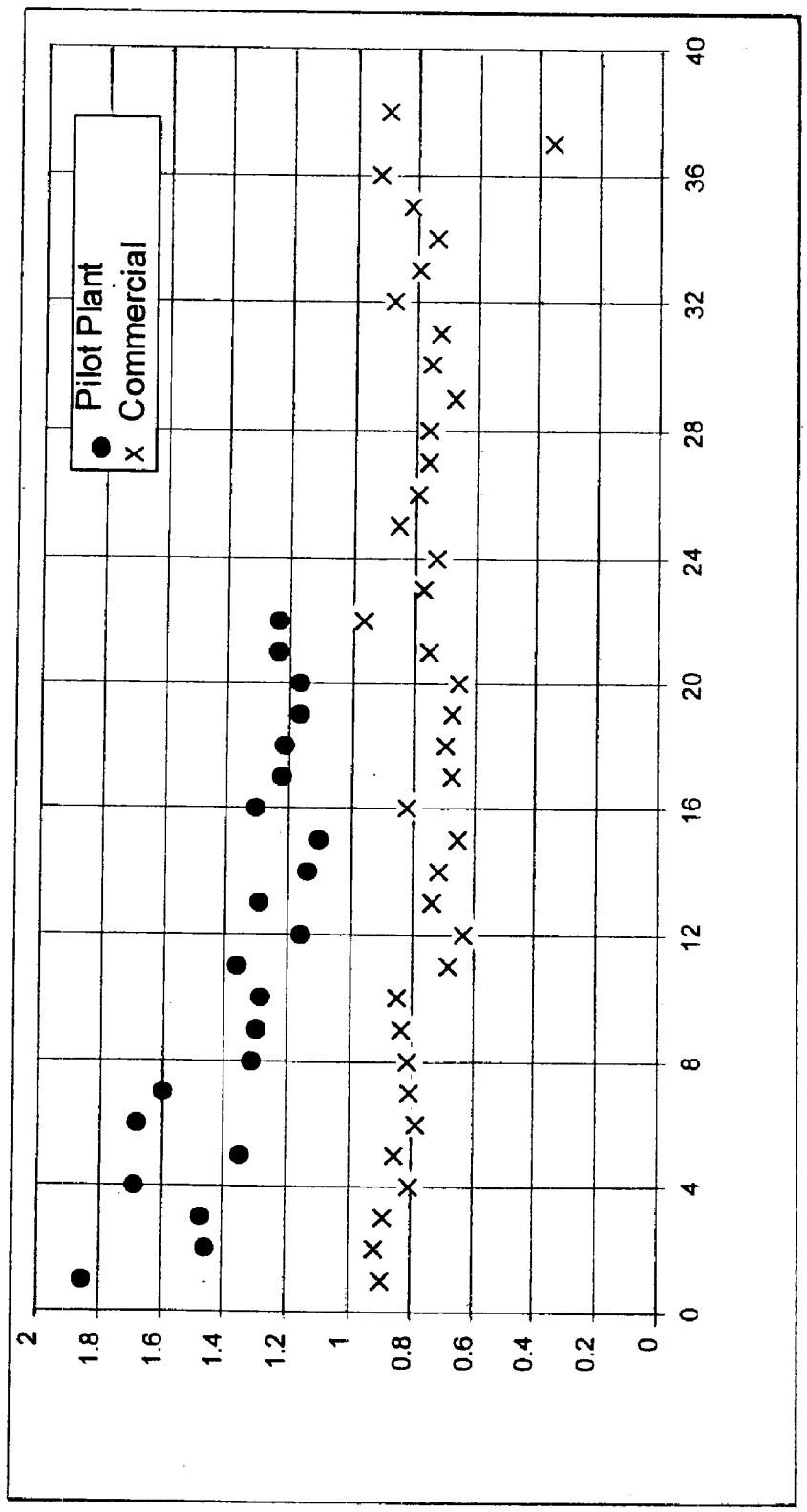
FIG. 4 is a plot of data showing olefin saturation of a cat naphtha in a stacked catalyst bed arrangement using a conventional catalyst activation procedure in a pilot plant, versus the catalyst activation procedure in a commercial unit.

For comparison, a commercial process unit containing a stacked bed of the catalyst set forth above, except the ratio was Cat A/Cat B of 40/60. The activation of this stacked bed of catalyst was performed in-situ starting with a 0.5 mole % $H_2S/H_2$ gas blend (3,500 scf/B) and a virgin naphtha (20,000 barrels). The stacked bed of catalyst was heated to a temperature of 400° F. at a rate of 10 to 15° F. per hour and held at that temperature (all vapor phase) at a reactor pressure of about 300 psig until breakthrough of $H_2S$ was observed. The $H_2S$ concentration in the treat gas was then increased to 1.0 to 1.5 mole % in hydrogen and the reactor temperature increased to 590° F. (all vapor phase). After breakthrough of $H_2S$ was observed, the reactor was cooled to 400° F. and an intermediate/heavy cat naphtha, as described above was introduced. FIG. 3 hereof shows comparable commercial and pilot plant sulfur removal activities. Also, FIG. 4 hereof, shows lower olefin hydrogenation activity for the commercial feedstock using the improved activation method, and Table 2 hereof shows a summary of the benefit of the activation method.

TABLE 1

|  | Standard Activation Method | Improved Activation Method |
| --- | --- | --- |
| Percent Hydrodesulfurization | 97.5 | 97.1 |
| Percent Olefin Saturation | 49.8 | 44.0 |

TABLE 2

|  | Standard Activation Method | Improved Activation Method |
| --- | --- | --- |
| Percent Hydrodesulfurization | 98.9 | 98.3 |
| Percent Olefin Saturation | 56.2 | 52.9 |

What is claimed is:

1. A hydrodesulfurization process using an activated CoMo supported catalyst, comprising:
   (a) heating a Co/Mo supported catalyst to a first temperature of about 350° F. to about 450° F. in a first effective amount of time, in the presence of hydrogen and hydrogen sulfide, and in the presence of a substantially olefin-free virgin naphtha at a first effective pressure such that the environment is not a reducing environment;
   (b) holding the Co/Mo supported catalyst at 350° F. to about 450° F. for a second effective amount of time so that at least 20% of the metals capable of sulfiding will sulfide;
   (c) further heating said Co/Mo supported catalyst to a second temperature from about 550° F. to 700° F. in the presence of hydrogen and hydrogen sulfide and in the presence of the virgin naphtha and at a second effective pressure such that the environment is non-reducing, so that substantially all of the metals are sulfided in order to form the activated CoMo supported catalyst; and
   (d) selectively hydrodesulfurizing a feedstock containing a cracked naphtha in the presence of a catalytically effective amount of the activated CoMo supported catalyst under selective hydrodesulfurization conditions.

2. The process of claim 1 wherein the cracked naphtha contains about 5 wt. % to about 50 wt. % olefins.

3. The process of claim 1 wherein the cracked naphtha has a diene concentration of 0.02 to 15 wt. %.

4. The process of claim 1 wherein the first temperature is reached by heating at a rate of about 10° F. to about 80° F. per hour.

5. The process of claim 1 wherein the first and second pressures range from about 200 to about 400 psig.

6. The process of claim 1 wherein the first temperature is reached by heating at a rate of about 30° F. to about 60° F. per hour with the first pressure in the range of about 250 to 350 psig.

7. The process of claim 1 wherein the cracked naphtha feedstock is a cat naphtha and contains a sulfur concentration of about 0.05 to 0.7 wt. %, based on the total weight of the cat naphtha.

8. The process of claim 1 wherein the cracked naphtha is selected from the group consisting of cat naphtha, coker naphtha, hydrocracker naphtha, resid, and hydrotreater naphtha.

9. The process of claim 1 wherein the virgin naphtha used in step (a) contains about 100 wppm to about 1,000 wppm sulfur.

10. The process of claim 1 wherein the selective hydrodesulfurization conditions include a temperature ranging from about 230° C. to about 427° C.; a pressure ranging from about 60 to 800 psig; a hydrogen feed rate ranging from about 1000 to 5000 standard cubic feet per barrel; a hydrogen purity ranging from about 20 to 100 vol. %; and liquid hourly space velocity ranging from about 0.5 $hr^{-1}$ to about 15 $hr^{-1}$.

11. The process of claim 1 wherein the selective hydrodesulfurization conditions include a temperature ranging from about 260° C. to about 355° C.; a pressure ranging from about 200 to 500 psig; a hydrogen feed rate ranging from about 1000 to 2500 scf/b; a hydrogen purity ranging from about 65 to 100 vol. %; and a liquid hourly space velocity ranging from about 1 $hr^{-1}$ to about 5 $hr^{-1}$.

* * * * *